United States Patent [19]
Sugita et al.

[11] Patent Number: 5,489,161
[45] Date of Patent: Feb. 6, 1996

[54] BALL JOINT EQUIPPED WITH A DUST COVER

[75] Inventors: Juichi Sugita; Hironobu Sugiura, both of Kanagawa, Japan

[73] Assignee: NHK Spring Co., Ltd., Kanagawa, Japan

[21] Appl. No.: 168,890

[22] Filed: Dec. 16, 1993

[30] Foreign Application Priority Data

Feb. 22, 1993 [JP] Japan ................ 5-012027 U

[51] Int. Cl.⁶ .................................................. F16C 11/06
[52] U.S. Cl. .................... 403/134; 403/119; 277/212 FB
[58] Field of Search .................. 277/212 FB, 212 R; 403/11, 23, 134, 122, 119

[56] References Cited

U.S. PATENT DOCUMENTS

| | | | |
|---|---|---|---|
| 3,683,421 | 8/1972 | Martinie | 277/212 FB X |
| 4,854,428 | 8/1989 | Horvath | 277/212 FB X |
| 5,011,321 | 4/1991 | Kidokoro | 403/122 X |
| 5,044,811 | 9/1991 | Suzuki et al. | 403/134 |
| 5,152,628 | 10/1992 | Broszat et al. | 403/122 X |
| 5,335,751 | 8/1994 | Kuroki | 277/212 FB X |

FOREIGN PATENT DOCUMENTS

| | | | |
|---|---|---|---|
| 596894 | 8/1959 | Italy | 277/212 R |
| 63-39452 | 10/1988 | Japan . | |

*Primary Examiner*—Anthony Knight
*Attorney, Agent, or Firm*—Skjerven, Morrill, MacPherson, Franklin, & Friel

[57] ABSTRACT

In a ball joint, a ball seat member is fitted into a housing, a ball stud having a spherical head is rotatably received in a cavity of the ball seat member, and a dust cover extends between a stem portion of the ball stud and a peripheral part of the open end of the housing, the end of the dust cover associated with the housing is held between an external flange provided in the ball seat member and the annular end surface of the open end of the housing. Because the end of the dust cover is firmly clamped and pressed over its entire circumference between the annular end surface and the external flange, a reliable clamping action can be produced. Because the securing process can be accomplished at the same time as the process of fitting the ball seat member into the housing without in any way complicating the assembling process, the material and fabrication costs can be reduced, and an economical ball joint can be provided.

8 Claims, 5 Drawing Sheets

BALL JOINT EQUIPPED WITH A DUST COVER

RELATED APPLICATION

This application relates to U.S. application Ser. No. 08/132,140 filed Oct. 4, 1993 and having a common inventor.

TECHNICAL FIELD

The present invention relates to a ball joint, and in particular to a ball joint equipped with a dust cover.

BACKGROUND OF THE INVENTION

A number of ball joints have been conventionally known. For instance, Japanese utility model publication (kokoku) No. 63-39452 discloses a ball joint equipped with a dust cover. According to this prior art, as illustrated in FIG. 7, the ball joint comprises a housing 51 defining an inner chamber and having an open end, a ball seat member 53 fitted into the inner chamber of the housing 51, a ball stud 52 having a spherical head disposed in a cavity defined in the ball seat member 53 and a stem portion connected to this spherical head and extending out of the open end of the housing 51, and a dust cover 54 extending between the housing 51 and the external surface of the stem portion of the ball stud 52. An annular recess 55 is formed around the outer circumferential surface of the open end of the ball seat member 53, and an annular bead 56 provided on the peripheral edge of the associated end of the dust cover 54 is fitted into this annular recess 55. Furthermore, a thin walled open end portion 57 of the housing 51 is crimped onto the entire outer circumferential surface of the open end of the ball seat member 53 with the result that the ball seat member 53 is firmly secured in the housing 51 and the bead 56 of the dust cover 54 is firmly retained in the annular recess 55.

According to this structure, one can obtain the advantage that the dust cover 54 can be secured without using any clips for securing purpose. However, because uniformly deforming the open end portion 57 of the housing 51 is highly difficult to accomplish, and excessive local deformations tend to occur, a high dimensional precision must be maintained. Furthermore, it is difficult to stabilize the securing force and the sealing capability. Various measures can be taken, but such measures will increase the fabrication cost. Thus, crimping for securing a dust cover has various shortcomings.

BRIEF SUMMARY OF THE INVENTION

In view of such problems of the prior art, a primary object of the present invention is to provide a ball joint equipped with a dust cover which can be fabricated both economically and simply.

A second object of the present invention is to provide a ball joint equipped with a dust cover which is provided with both simple and compact means for securing the end of the dust cover associated with the housing.

A third object of the present invention is to provide a ball joint equipped with a dust cover which is reliable in use.

According to the present invention, these and other objects can be accomplished by providing a ball joint, comprising: a housing having a side wall and an open axial end; a ball seat member fitted into the housing and internally defining a cavity; a ball stud having a spherical head rotatably received in the cavity, and a stem portion extending

2 out of the open end of the housing; and a dust cover having a first end fitted on the stem portion of the ball stud and a second end secured to a peripheral part of the open end of the housing; the second end of the dust cover being held between an external flange provided in the ball seat member and an annular end surface of the open end of the housing.

Thus, the end of the dust cover associated with the housing or the second end of the dust cover is clamped between the external flange provided in the ball seat member and the open end surface of the housing, and is firmly secured between them without using any clips or other securing means. Furthermore, because the second end of the dust cover can be secured at the same time as fitting the ball seat member into the housing, the assembly work is simplified.

According to a preferred embodiment of the present invention, so that the second end may be particularly securely held, and a favorable sealing can be ensured, the second end of the dust cover is provided with a bead extending over an entire circumference of the second end, while the external flange of the ball seat member and/or the annular end surface of the open end of the housing is provided with an annular recess adapted to receive the bead of the dust cover.

Alternatively or additionally, the second end of the dust cover may be provided with an annular recess extending over an entire circumference of the second end, while the external flange of the ball seat member and/or the annular end surface of the open end of the housing is provided with an annular bead adapted to be received in the annular recess of the dust cover.

For further simplification of the fabrication process, and more compact design of the ball joint, it is preferred that the annular end surface of the open end of the housing is defined by a radial external flange, and the ball seat member is made of plastic material.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
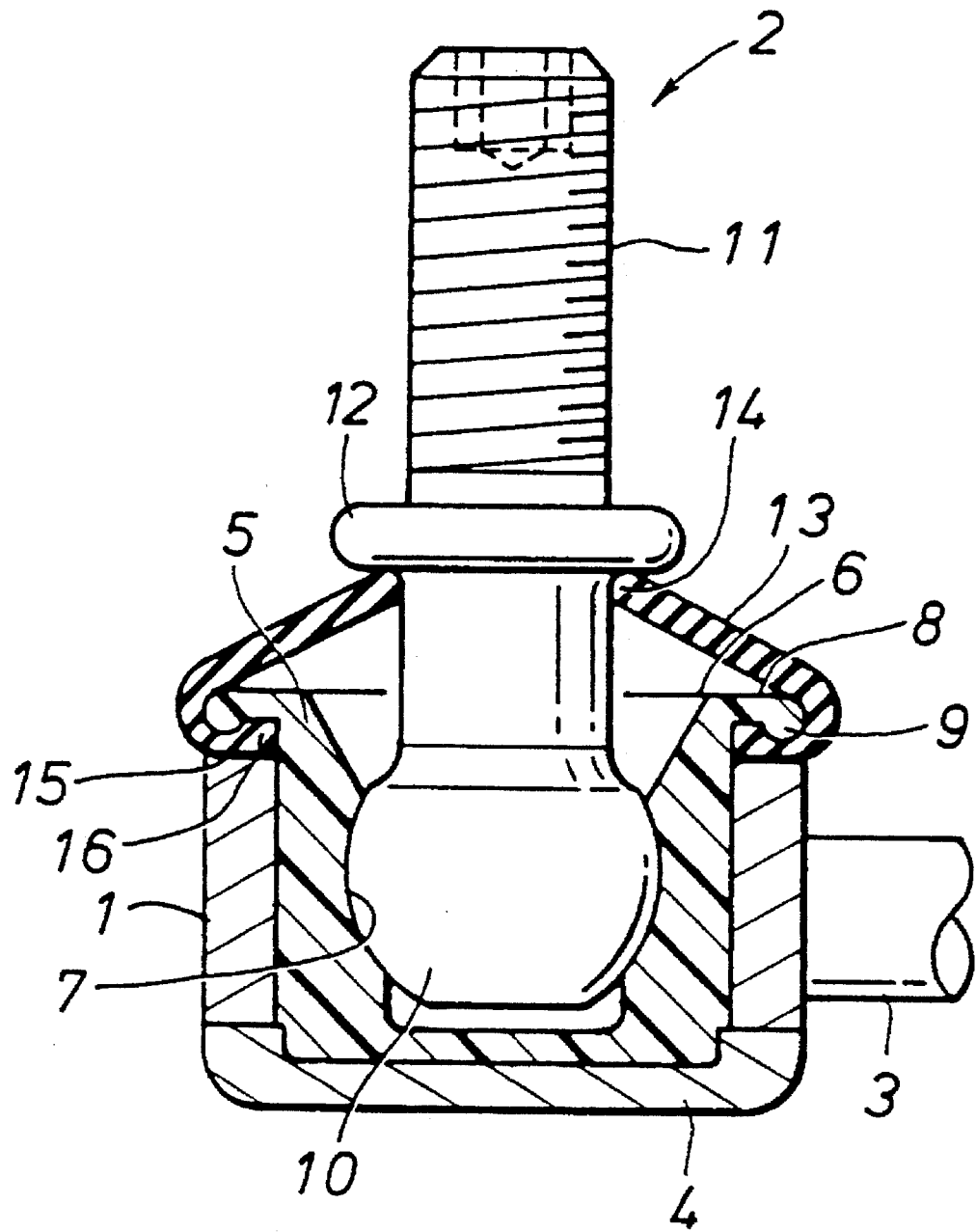
FIG. 1 is a sectional view showing a first embodiment of the ball joint according to the present invention.

FIG. 1 is a sectional view of a ball joint according to the present invention which comprises a housing 1 adapted to be connected to an external member, and a ball stud 2 adapted to be connected to another external member. The housing 1 has a cylindrical shape, and is integrally provided with a rod 3 extending radially from an outer circumferential surface of the housing 1. The rod 3 is adapted to be connected to the one external member. The open lower end surface of the housing 1 is closed by a lid member 4.

A substantially cup-shaped ball seat member 5 made of plastic material is fixedly secured, preferably by press fitting, inside the housing 1, and defines a cavity 7 which is slightly less in diameter than the open end 6 of the ball seat member 5. The end surface of the ball seat member 5 associated with the open end 6 is provided with an external radial flange 8, and a bead 9 continuously extending along the outer periphery of the flange 8.

The cavity 7 of the ball seat member 5 rotatably receives a spherical head 10 of the ball stud 2, and retains it. The ball stud 2 is provided with a leg portion 11 which is adapted to be threaded into the other external member. A middle part of the ball stud 2 is integrally provided with a radial flange 12.

A dust cover 13 extends between an end surface 1a of the housing 1 and the outer periphery of the ball stud 2 so as to close the open end 6 of the ball seat member 5. The dust cover 13 is made of rubber material, and has the shape of an umbrella. Its upper end is provided with a small diameter opening 14, and its large diameter end is provided with an internal radial flange 15 which is shaped so as to be folded back inwardly. The inner periphery of this internal radial flange 15 is provided with a bead 16 extending continuously over the entire circumference of the dust cover 13.

Figure 2:
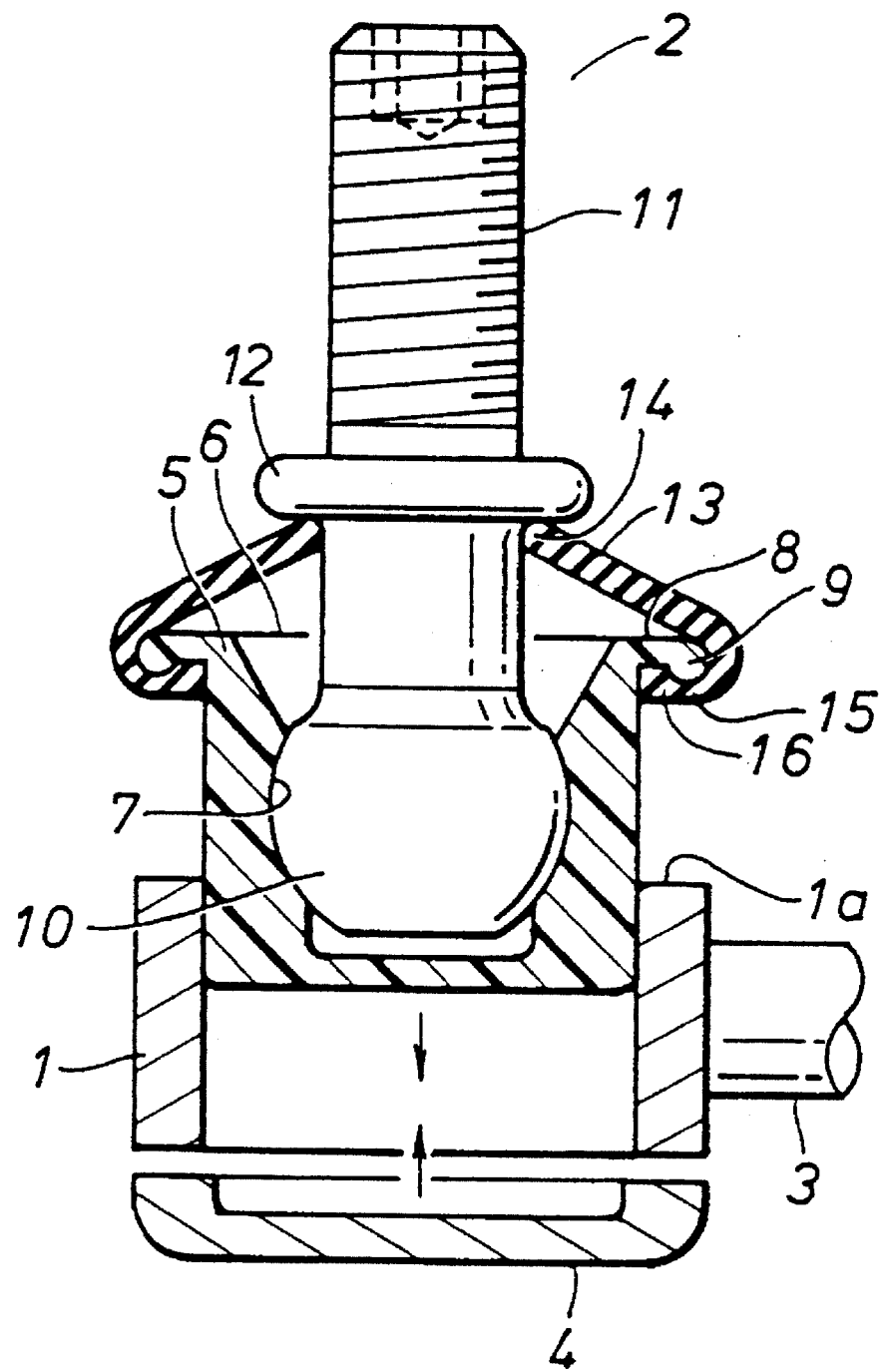
FIG. 2 is a sectional view showing the assembling process of the ball joint of FIG. 1.

When assembling the ball joint having the above described structure, the spherical head 10 of the ball stud 2 is pushed into the open end 6 of the ball seat member 5 until the spherical head 10 is slidably received in the cavity 7 as illustrated in FIG. 2. At the same time, the small diameter open end 14 of the dust cover 13 is fitted onto the part of the ball stud 2 immediately below the flange 12, and the internal flange 15 of the dust cover 13 is fitted onto the entire circumference of the external flange 8 of the ball seat member 5.

Then, the thus prepared assembly is fitted into the housing 1 by sliding the outer circumferential surface of the ball seat member 5 over the inner circumferential surface of the housing 1. By so doing, the internal flange 15 of the dust cover 13 is interposed between the upper end surface 1a of the housing 1 and the external flange 8 of the ball seat member 5, and is securely held therebetween so that the large diameter open end of the dust cover 13 can be securely held. Finally, the lid member 4 and the ball seat member 5 are secured to each other by welding or adhesive bonding to complete the ball joint.

Alternatively, the lid member 4 may be secured to the housing 1 before fitting the ball seat member 5 into the housing 1. In this case, it is possible to control the gap between the external flange 8 of the ball seat member 5 and the annular end surface of the housing 1 by the abutment of the bottom end of the ball seat member 5 onto the lid member 4. Therefore, the produced clamping force can be controlled, and the associated end of the dust cover 13 can be clamped by optimum clamping force which ensures a sufficient retaining force and sealing capability without damaging the associated end of the dust cover 13 with excessive clamping force.

Figure 3:
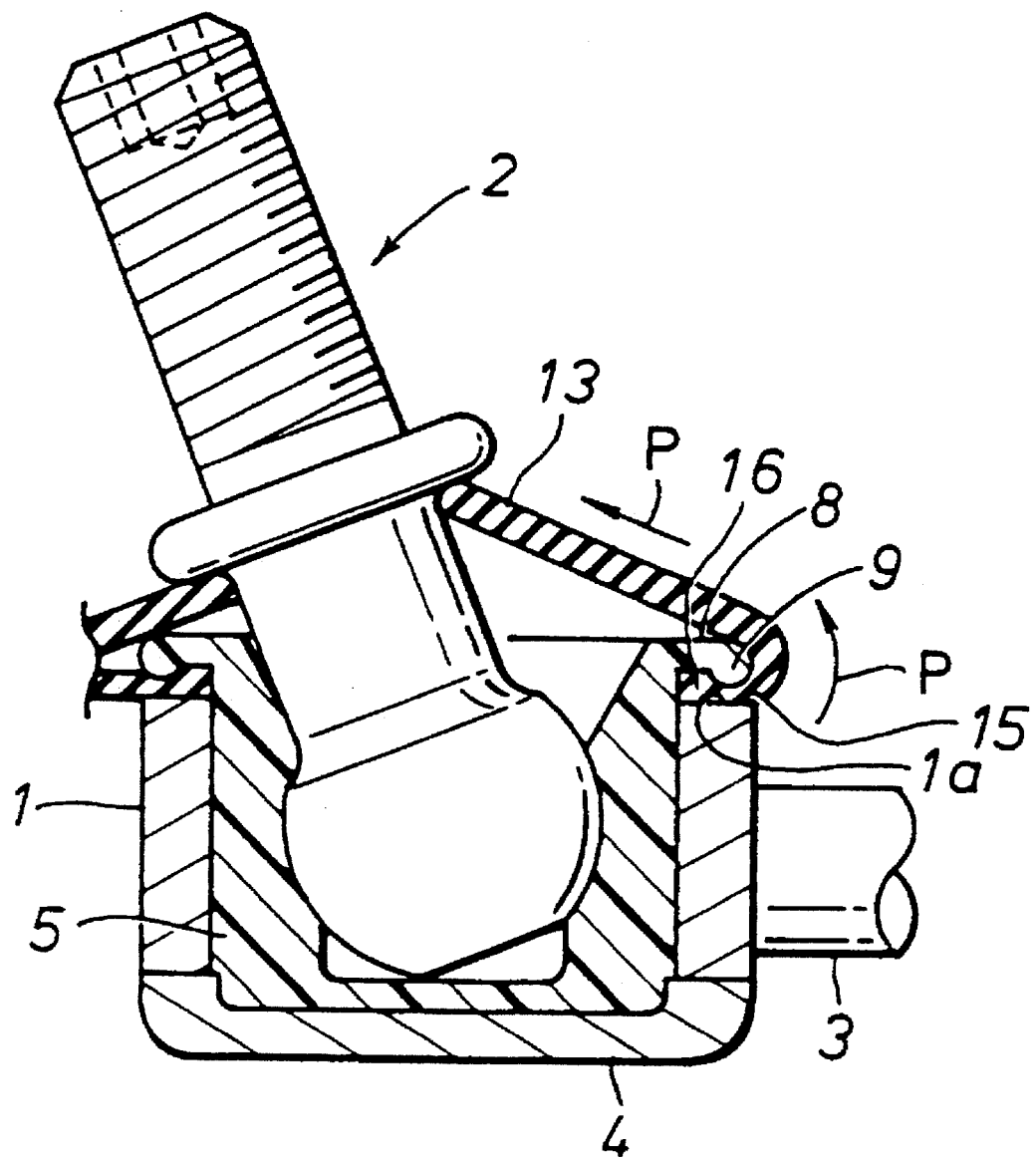
FIG. 3 is a sectional view showing the operation of the ball joint of FIG. 1.

In either case, because the internal flange 15 of the dust cover 13 is held over its entire circumference between the upper end surface 1a of the housing 1 and the external flange 8 of the ball seat member 5, and are pressed therebetween. Therefore, even when a force P is applied to the flange 15 due to the swinging movement of the ball stud 4 as illustrated in FIG. 3, the pressing force holding the ball joint together can overcome this force P. Furthermore, the fabrication process can be simplified and the fabrication cost can be reduced because the dust cover 13 can be secured at the same time as fitting the ball seat member 5 into the housing 1, and the number of fabrication steps can be reduced. In particular, crimping of an end of the housing is not required as opposed to the prior art.

When a force is produced in the ball joint so as to pull the internal flange 15 of the dust cover 13, because the bead 16 formed in the internal flange 15 is pressed upon the bead 9 formed in the external flange 8 of the ball seat member 5, it is possible to withstand such a force.

Figure 4:
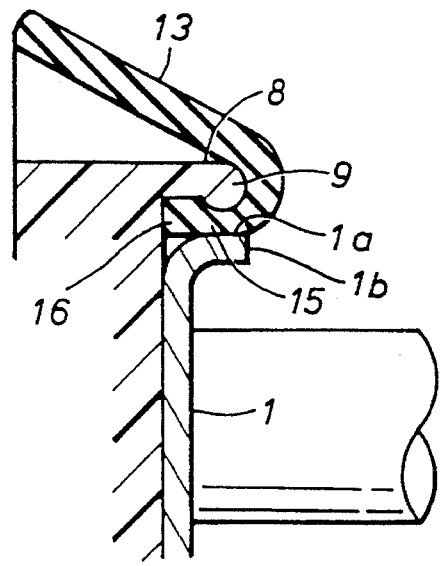
FIG. 4 is a sectional view showing a second embodiment of the present invention having a modified structure for clamping an end of the dust cover.

The dust cover 13 can be securely engaged also by integrally forming the end surface 1a of the housing 1 with a radial external flange 1b as illustrated in FIG. 4. The housing 1 in this case is made of stamped sheet metal. In this case, the wall thickness of the housing 1 can be reduced, and the ball joint can be made even more compact.

Figure 5:
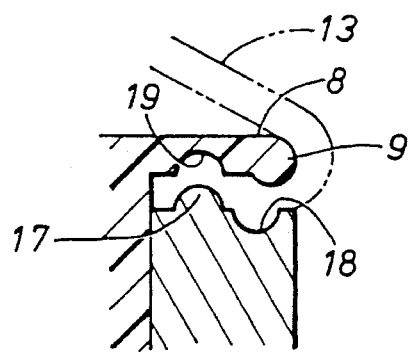
FIGS. 5 and 6 are sectional views showing a third embodiment of present invention having a modified structure for clamping an end of the dust cover.
Figure 6:
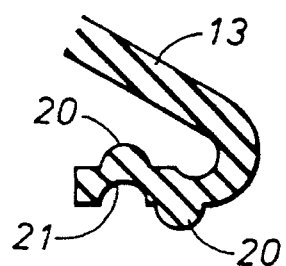
Figure 7:
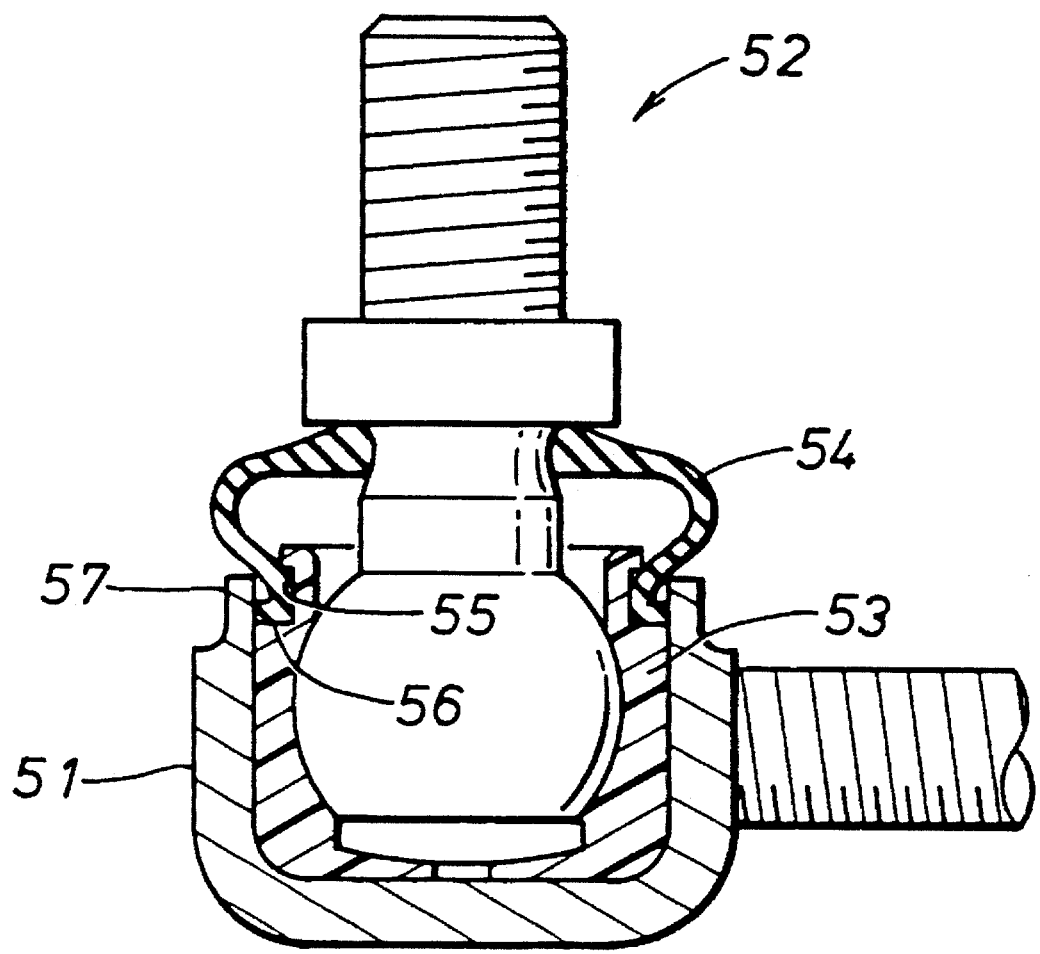
FIG. 7 is a sectional view showing a conventional ball joint.

Also, as shown in FIGS. 5 and 6, the end surface 1a of the housing 1 may be provided with a projection 17 and a recess 18, and the external flange 8 of the ball seat member 5 may be provided with a recess 19 while the internal flange 15 of the dust cover 13 is provided with projections 20 and a recess 21 which are complementary to the recesses 18 and 19 and the projection 17 so that the dust cover 13 can be positively prevented from coming off.

In this embodiment, the radial flange 8 of the ball seat member 5 and the internal flange 15 of the dust cover 13 are provided with beads 9 and 16, or the end surface 1a of the housing, the external flange 8 and the internal flange 15 are provided with projections 17 and 20 and recesses 18, 19 and 21 for preventing the dust cover 13 from being dislodged. However, the dust cover 13 may be fixedly secured even when necessary parts of the dust cover is secured by flat surfaces.

Thus, according to the present invention, the dust cover can be secured by clamping an end of the dust cover associated with the housing between the external flange provided in the ball seat member and the open end surface of the housing, and clips or the likes are not required for securing the dust cover. Therefore, the dust cover can be secured without substantially changing the assembly process, and the costs for the component parts and the assembly work can be reduced, and the present invention can thus provide a ball joint which is economical and provided with a favorable sealing capability and a high performance.

Although the present invention has been described in terms of a specific embodiment thereof, it is possible to modify and alter details thereof without departing from the spirit of the present invention.

What we claim is:

1. A ball joint, comprising:

a housing having a side wall and an open axial end;

a ball seat member fitted into said housing and internally defining a cavity;

a ball stud having a spherical head rotatably received in said cavity, and a stem portion extending out of said open end of said housing; and a dust cover having a first end fitted on said stem portion of said ball stud and a second end secured to a peripheral part of said open end of said housing;

said second end of said dust cover being held between an external flange provided in said ball seat member and an annular end surface of said open end of said housing, said second end of said dust cover having at least one peripheral annular bead and an adjacent annular recess and wherein said ball seat member includes an annular peripheral bead and an adjacent annular recess, such that the bead of the dust cover second end abuts the seat member recess and the bead of the ball seat member abuts the recess of the second end of the dust cover.

2. A ball joint according to claim 1, wherein said housing is provided with a bottom wall to which an associated axial end of said ball seat member abuts, thereby defining a gap between said external flange of said ball seat member and said annular end surface of said housing for holding said second end of said dust cover.

3. A ball joint according to claim 1, wherein said housing is made of stamped sheet metal, and said annular end surface of said open end of said housing is defined by a radial external flange.

4. A ball joint according to claim 1, wherein said ball seat member is made of plastic material.

5. A ball joint according to claim 1, wherein when said spherical head is angularly rotated in the cavity, the dust cover second end bead is pressed upon the bead of the ball seat member.

6. A ball joint according to claim 1, wherein said annular end surface includes a curved projection and curved recess for receiving, respectively, a curved part of said dust cover peripheral annular bead and a curved part of said dust cover adjacent annular recess on an underside of the second end of said dust cover.

7. A ball joint according to claim 1, wherein said second end of said dust cover is in clamped connection between said ball seat member external flange and said annular end surface of the housing when said ball seat member is received within said cavity.

8. A ball joint according to claim 1, wherein said ball seat member is press fitted into said housing and said dust cover second end is secured at the same time between said ball seat member external flange and said housing annular end surface.

* * * * *